Patented Mar. 7, 1944

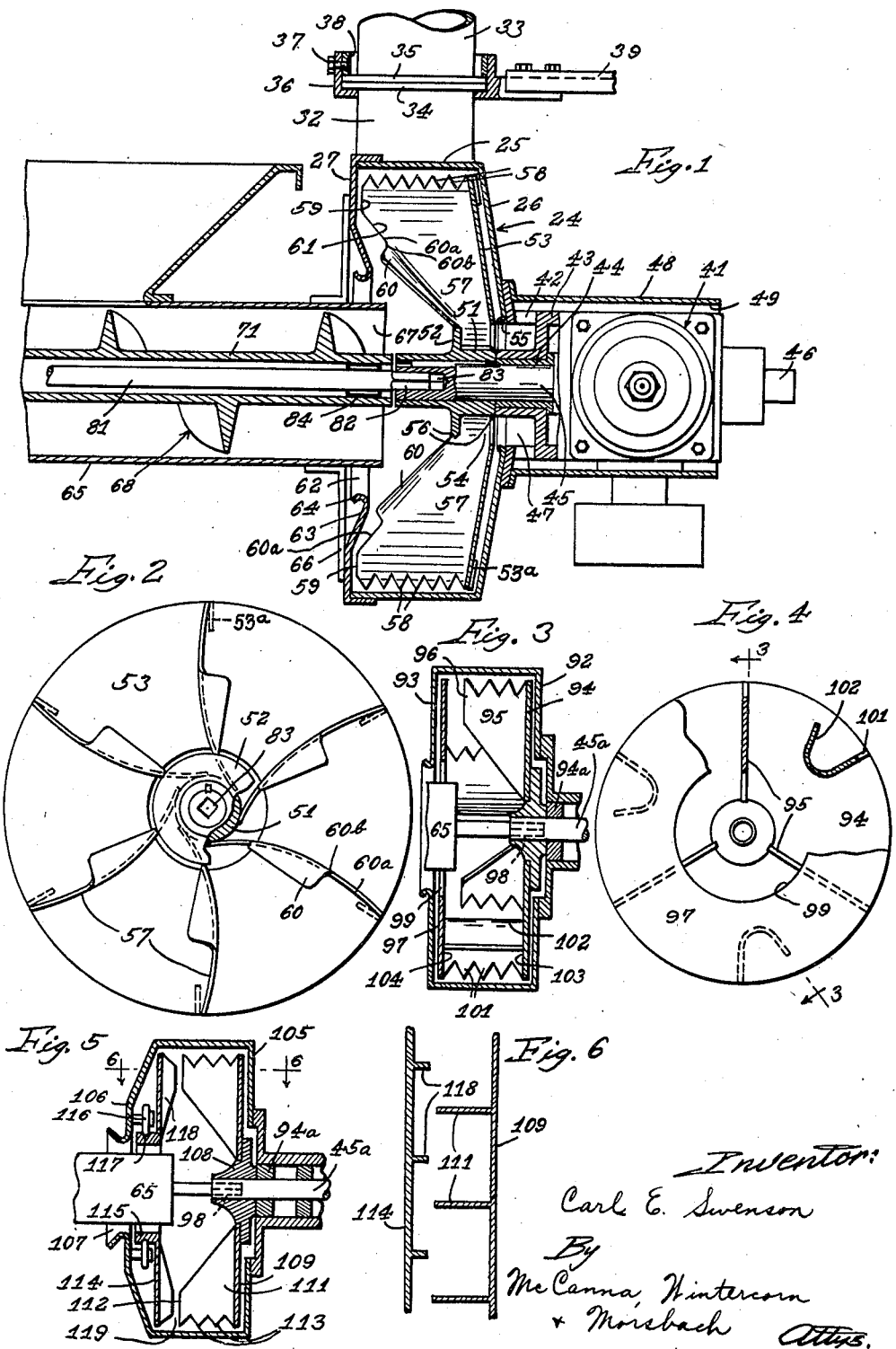

2,343,714

UNITED STATES PATENT OFFICE 2,343,714

BLOWER

Carl E. Swenson, Rockford, Ill.

Application June 19, 1941, Serial No. 398,716

14 Claims. (Cl. 302—37)

This invention relates to blowers and the like, and has special reference to blowers of the type particularly adapted for handling fibrous or granular material such as silage, hay, and similar farm produce.

While the blower herein shown and described is suitable for handling a wide variety of materials in addition to farm produce, I have for convenience shown and described the same as applied to such use and as embodied in what is commonly called a silo filler and as used in agriculture for conveying all types of roughage, such as silage, hay, straw and the like. The present application is a continuation in part of my copending application Serial No. 385,232, filed March 26, 1941, now Patent No. 2,324,042, issued July 13, 1943, and entitled "Conveyer apparatus," in which application other phases of the invention are shown and described.

An important objection to blowers of this character as known in the past is that the efficiency thereof has been greatly handicapped by material wedging into the spaces between the impeller blades and the casing and thus producing an excessive drag even to the extent of occasionally stalling the blower, the material also being damaged as an incident to this occurrence. In other cases, even though operating with some degree of satisfaction, the aerodynamic quality of the blower is impaired due to material hanging to or entangling with the blades of the impeller and thus producing additional air resistance.

It has been common practice in such blowers to build the blades of the impeller so as to provide very little clearance between the housing of the blower and the ends of the blades for the reason that a limited amount of clearance was deemed necessary to eliminate wedging of material between the ends of the blades and the inside of the blower housing. I have found that even if this feature of construction were successful in preventing wedging of the material, which it is not, such construction does not produce good blower results because the compressed air is confined until the cell-shaped compartments between the vanes arrive at the proximity of the blower discharge so that a uniform flow of air is not produced.

An important object of the invention is therefore the provision of a blower of the character described of generally improved efficiency.

Another object of the invention is the provision of a blower having improved means for feeding the material to the proper point therein.

I have also aimed to provide an improved and more efficient blower of the type described having a novel form of impeller, and novel means for controlling the flow of the solid material and air through the blower.

A still further object of the invention is the provision of a blower having a novel form of impeller blade such as to prevent fibrous material from hanging on the blades and to cause the deposit thereof into the space between the blades due to rotation of the impeller.

A still further object of the invention is the provision of a blower having a novel combination of impeller and housing producing improved aerodynamic qualities and improved material handling properties in the blower.

Other objects and advantages will appear from the following description and the accompanying drawing, in which—

Figure 1 is a vertical section through a blower and a fragmentary portion of a feed hopper showing one embodiment of the invention;

Fig. 2 is a face view of the impeller shown in Figure 1;

Fig. 3 is a vertical section through a modified form of blower;

Fig. 4 is a face view of the impeller shown in Fig. 3, the impeller being partly in section;

Fig. 5 is a section through a further embodiment of the invention, and

Fig. 6 is a developed section through the impeller taken along the line 6—6 of Fig. 5.

The blower in its preferred form is shown in Figure 1 and includes a housing indicated generally by the numeral 24, approaching the cylindrical in form and having an outer peripheral wall 25 and side walls 26 and 27. The cylindrical portion 25 has a delivery tube 32 of conventional form disposed at one side thereof, in this instance adapted to make connection with a delivery pipe 33 of the type commonly used for delivering material from the blower to a remote point. As described in said application, these may be connected by flanges 34 and 35 on the pipe and tube, respectively, adapted to be positioned in abutment as shown in Figure 1. A collar 36 is disposed around the flanges, and the flanges are held together by bolts 37 extending through the collar. An additional sleeve 38 may be provided around the pipe 33 and engaged by the screws 37 to prevent rotation of the pipe 33 with rotation of the blower, as described in said application, the collar 36 being supported rigidly in place by means of an arm 39 attached to a fixed support.

Attached to the outer surface of the frusto-conical side member 26 is an engine indicated generally by the numeral 41, the engine in this instance suitably being a two-cylinder opposed piston air cooled engine. The engine is preferably attached to said side member and supported thereon by means of brackets 42, which in this instance are integral with a bearing support 43 within which is disposed a bearing 44 supporting one end of the crank shaft 45 of the engine, the other end of the crank shaft being supported in a bearing 46. The crank shaft 45 projects inwardly through the blower side wall 26, the side wall being provided with a centrally disposed opening 47 arranged for the passage of a limited amount of air therethrough for ventilation purposes. The motor 41 is enclosed around its sides by an enclosure 48, in this instance open at its end as shown at 49 so as to confine the flow of air through the opening 47 and to cause the same to pass in close proximity to the cylinders of the engine, thus effecting a flow of forced air over the cooling fins of the engine.

Positioned on the end of the shaft 45 and disposed within the blower housing is a hub comprising a sleeve portion 51 keyed to the shaft 45 and a flange portion 52 spaced from the inner surface of the side 26. Attached to the hub 51 and the flange 52 are a plurality of impeller vanes 57 presently to be more fully described, each of the vanes having an inner end 54 welded edgewise against the hub 51 and flange 52 as shown at 56 so as to be disposed between the inner surface of the side 26 and the flange 52. Attached to the inner edges of the vanes 57 is a disk 53 complementary to the inner surface of the housing side 26, the disk being frusto-conical so as to lie in parallel closely spaced relation to the inner surface of the side 26. Preferably the side 26 is curved inwardly as shown at 55 around the opening 47 so as to rest in close proximity to the disk 53 and inhibit the flow of air therebetween and the side of the disk 53 adjacent the wall 26 is provided with small ribs 53a adjacent the periphery of the disk and spaced annularly thereof to induce an outward flow of air along the wall 26 and thus act to prevent recirculation. It will be seen that the center of the disk 53 is provided with an opening registering with the opening 47 so that the opening 47 communicates with the chamber of the blower housing by way of the space between the inner ends 54 of the vanes, to provide a secondary air inlet to the space between the vanes, air being drawn into the blower housing through these channels, through the opening 47 and the enclosure 48, as heretofore described.

The impeller vanes 57 extend outwardly and in a somewhat radial direction about the center of rotation of the shaft 45, as will be seen from Fig. 2, the vanes being curved slightly so that their concave side is the leading side of the vane. Each of these vanes has an outer end provided with a plurality of spaced teeth 58 in the shape of saw teeth, the ends of the teeth extending to a point adjacent the periphery 25 of the blower housing, an outer edge as indicated at 59 terminating in spaced relation to the side 27 of the blower sufficient to permit the passage of solid material between the edge of the vane and the side of the blower, and a sloping entrance edge 61 sloping from the proximity of the hub toward the free edge 59, the degree of this slope being such that long strands of fibrous material which may become trained over these edges will slide thereon under the forces acting on the solid material at the normal speed of blower operation. Formed along the edge 61 of each of the vanes is an overhanging fin indicated generally by the numeral 60, the fin projecting laterally outward from the surface of the vane at an angle approaching a right angle, the fin terminating short of the end of the edge 61 as indicated at 60a, the fin tapering in width from the flange 52 outwardly and being cut back at its end as indicated at 60b, the purpose of these fins being to deflect any fibrous material which may straddle the vane and cause it to be deposited in the area between the vanes and away from the side walls 27 and 63 as it slides radially and laterally along the fins.

The side 27 of the blower casing is provided with a central opening 62 preferably concentric with the axis of the shaft 45, the side 27 being curved inwardly as shown at 63 annularly of the opening 62. The opening 62 provides a primary air inlet to the blower and also provides space for the reception of means for supplying solid material to the blower. Preferably the metal is curved outwardly directly at the opening as shown at 64 to provide desirable aerodynamic characteristics at the opening 62.

A feed tube, designated generally by the numeral 65, is supported to project through the central opening 62 preferably concentric therewith, and is supported on the blower housing by means of brackets 66, the end 67 of the feed tube preferably projecting into the blower slightly beyond the plane of the opening 62. The solid material to be conveyed is fed into the blower housing through the feed tube 65 by means of a feed screw 68 disposed within the feed tube, carried on a tube 71 and driven as described in my said prior application from the engine 41 by means of a shaft 81 having a squared end 82 received in a squared opening 83 in the end of the shaft 45. The end of the shaft 71 is given lateral support on the shaft 81 by means of a roller bearing 84 disposed on the shaft 81, as will be seen from Figure 1.

In operation, the material is discharged from the end of the feed tube 65 and air is simultaneously drawn in through the central opening 62 in a direction to cause the solid material to move away from the stationary side 27 of the blower while the entrance of air through the opening 47 prevents violent impact of the material against the impeller. This movement of the material away from the stationary side 27 is further facilitated by depositing the material toward the center of the housing and by dishing the side wall 27 adjacent the central opening as shown at 63. This greatly tends to eliminate side wall friction, that is, friction of the material being dragged over the stationary side wall 27 of the housing, since centrifugal force urges the material in the direction of the revolving disk 53. Furthermore, due to the dishing of the side wall 27, the radial flight of the material through the blower carries the material away from this stationary wall. In this way I have materially reduced or completely eliminated side wall friction and the resultant loss of efficiency and damage to the material.

As the material enters the housing it first meets with the shallow entrance edges of the vanes 57 adjacent the hub moving at a substantially lesser velocity than the same vanes at a greater radial distance from the axis. This causes the material to be accelerated more gradually and with less impact loss and less damage to the material. It will be seen that this gradual acceleration is facilitated by the fact that the impeller hub and the disk 53 are in rotation, and by the fact that the material is protected against contact with the stationary side 26 of the housing.

It will be seen that since the entrance edges of the vanes 57 have an angle such that the material will slide therealong under the centrifugal force existing in the blower, the trapping or catching of material thereon is prevented, since the material slides outwardly along the sloping ends 61 and most of it is deposited in the spaces between the vanes and away from the sides of the housing by action of the fins 60, and any particularly long pieces not thus disposed of slide past the edge 59 into the periphery of the housing.

The toothed outer ends 58 of the vanes function to substantially eliminate a number of difficulties heretofore associated with blowers of this type. The sides of the teeth are straight and converge at a wide angle as will be seen from Figs. 1, 3 and 5, the teeth being in the form commonly known as saw teeth to provide sharp points for engaging long or coarse fibers which may tend to plug the machine. In the first place, the provision of the saw teeth on the outer ends of the vanes which travel with small clearance at the inside periphery of the housing, cause the material to be moved over the peripheral surface with the tendency for wedging almost entirely eliminated. It will be seen that should an accumulation of material exist at any point along the periphery, the teeth will penetrate through the material so as to produce a minimum of pressure between the ends of the vanes and the peripheral surface, and the excess material will find room in the space between the ends of the teeth. On the other hand the angle at the sides of the teeth is such that the material cannot permanently wedge therebetween. Another advantage of this construction is that the space between the teeth provides an area for the circulation of air through the exhaust. Air circulation in the direction of rotation of the impeller and around the periphery toward the delivery pipe 32 improves the efficiency of the blower and reduces the tendency of the material to remain close to the ends of the vanes. Blowers constructed in accordance with this principle have shown no tendency to become hot at their peripheral surface, whereas the conventional blowers used for this purpose and having close fitting vanes across the entire peripheral surface become highly heated after a short period of operation. Thus, in this way I have eliminated the wedging of material at the ends of the vanes and simultaneously improved the air discharge efficiency.

Directing attention now more particularly to the modified form of the invention shown in Figs. 3 and 4, the impeller therein shown is suitable for use in place of the impeller of Fig. 1 with slight modifications in the shape of the blower housing. However, in this instance, I have shown a conventional casing including sides 92 and 93, a bearing 94a carrying a shaft 45a which may be driven in any suitable manner. The impeller includes a flat disk 94 to which radial impeller vanes 95, in this instance, three in number, are positioned, one edge 96 thereof being arranged in spaced relation to a second flat disk 97. The disk 97 is provided with a central opening 99 for the passage of the feed tube 65, and the shaft 45a may be provided with a socket 98 for driving the worm, or if desired, the worm may be driven by separate drive mechanism. Interposed between each of the vanes 95 is an additional vane, each of which have toothed outer ends as shown at 101, the vanes extending inwardly from the periphery only a short distance and then being curved outwardly as shown at 102 to provide an inner end of relatively great curvature, the curvature being such as to discourage the lodging of fibrous material on the inner ends of these vanes. The intermediate vanes are attached at their opposed edges to the disks 94 and 97 as shown at 103 and 104, these vanes serving to secure the disks together and to cause the disk 97 to rotate with the disk 94.

It will be seen that with this construction both of the side walls of the blower chamber rotate with the impeller vanes so that any possibility of the material being dragged over a stationary wall of the blower housing (other than the peripheral wall) is entirely eliminated. This blower construction has most of the advantages of that shown in Figure 1 and heretofore described, but has the disadvantage of being slightly more costly to manufacture.

In Figs. 5 and 6 I have shown a still further embodiment of the invention. In this form of the invention the housing is substantially similar to Fig. 3 and has side walls 105 and 106, the side wall 106 having a centrally disposed opening 107 corresponding to the opening 62 of Fig. 1. The impeller has a hub 108 driven by shaft 45a, and carried on the hub is a disk 109 adapted to rotate in relatively close proximity to the side wall 105. Carried on the disk 109 are radially disposed vanes 111 attached at one edge to said disk, having free edges 112 and teeth 113 at their outer ends in close proximity to the periphery of the blower housing. Mounted adjacent the side wall 106 is a second disk 114 having a central hub 115 providing a central opening for the passage of material to the space between the two disks.

The disk 114 is mounted for rotation against the side 106 by means of rollers 116 which seat in grooves 117 on the outer surface of the hub 115. The inner face of the disk 114 is provided with short vanes 118 equal in number to the vanes 111 and of a height such that when in registration with the vanes 111 a space exists between the edges of the two vanes, as indicated at 119.

In this form of the invention the disk 114 is free to float in the housing. As a result, this disk is normally driven by the fluid pressure of the air stream generated by the vanes 111. However, as material passes from the feed tube radially outward between the vanes of the impeller, the disk 114 is free to adjust itself in response to the wedging of material between the vanes 111 and the vanes 118. Consequently, upon the tendency of material to wedge between these vanes, the disk 114 will rotate with respect to the disk 109 to permit the passage of material radially outward between the two sets of vanes. It will be seen that this construction prevents the solid material from contacting the stationary sides of the blower during its passage therethrough and correspondingly reduces the frictional loss. Likewise, this form of the invention has most of the advantages above described in connection with the form of Figure 1.

I claim:

1. The combination in a blower of a housing of approximately cylindrical shape having spaced sides, one of said sides having a centrally disposed feed opening for the passage of solid material, a rotatable disk disposed in said housing adjacent the opposite side thereof, said disk being conically dished with the concave side thereof facing said feed opening, and a plurality of vanse on the concave side of said disk extending outwardly in said housing having the outer ends thereof positioned adjacent the inner surface of the periphery of said housing, said one of said sides being dished inwardly around said feed opening to direct the radial flight of said material toward said disk and away from the side adjacent said opening.

2. The combination in a blower of a housing of approximately cylindrical shape having spaced side walls and a centrally disposed feed conduit for solid material projecting through said side wall and to a plane intermediate said side walls to discharge solid material in a plane intermediate the side walls, said side wall being dished inwardly and having an opening around said conduit for admitting air to said housing and to direct the radial flight of said solid material away from said side wall.

3. The combination in a material handling blower of a housing of approximately cylindrical shape, and rotatable vanes extending outwardly in said housing, said vanes having outer ends adjacent the inner surface of the periphery of said housing and entrance edges sloped with respect to the plane of rotation of said vanes at an angle such that said material passing therethrough will slide along said edges under centrifugal force, said entrance edges having laterally disposed fins projecting forwardly from one side of said vanes having a point of maximum extension terminating short of the side edges of said vanes to divert said material into the space between the vanes and away from the sides of the housing.

4. The combination in a blower of a housing of approximately cylindrical shape having a centrally disposed feed opening for the reception of solid material, a rotatable disk disposed in said housing, and a plurality of vanes on said disk extending outwardly in said housing between said disk and said opening, said vanes having saw toothed ends positioned adjacent the inner surface of the periphery of said housing and entrance edges sloping with respect to the plane of rotation of said vanes at an angle such that said solid material will slide therealong under centrifugal force, and fins disposed along said entrance edges projecting in the direction of travel thereof and from the forward sides of said vanes, said fins terminating short of the outer periphery of said vanes to divert said solid material into the space between the vanes and away from the wall of said housing.

5. A blower for fibrous material such as silage comprising in combination a housing of somewhat cylindrical peripheral shape having spaced side walls, one of said walls having a centrally disposed air inlet, said wall substantially closing the remainder of one side of the housing and the other wall having a centrally disposed feed conduit for the passage of solid material into the housing and a primary air opening around said conduit for admitting air to the housing and for directing solid material entering through said feed opening in an inwardly and radially disposed direction away from said other wall, the centrally disposed air inlet of said first mentioned wall admitting air to the housing in amounts smaller than that from said primary air inlet to deflect solid material toward the center of the housing, an impeller rotatably disposed in said housing having a plurality of approximately radially disposed vanes having inner edges sloping from the central area of the impeller outwardly and toward said other wall through an angle such that long strands of fibrous material lodging over said edges will slide outwardly therealong at operating speed, the edges of said vanes adjacent their outer ends being spaced from the inner surface of said other side wall for the passage of said strands therebetween to the periphery of the housing, said vanes also having ends disposed in close proximity to the periphery of the housing, said ends having saw teeth spaced therealong formed by straight sided V-shaped notches having a wide angle between the sides in which fibrous material cannot permanently wedge, said teeth being disposed to pierce the long strands of fibrous material and prevent wedging of the material at the periphery.

6. A blower for fibrous material such as silage comprising in combination a housing of somewhat cylindrical peripheral shape having spaced side walls, one of said walls having a centrally disposed air inlet, said wall substantially closing the remainder of one side of the housing and the other wall having a centrally disposed feed conduit for the passage of solid material into the housing and a primary air opening for admitting air to the housing and said opening being disposed around said conduit for directing solid material entering through said feed opening in an inwardly and radially disposed direction away from said other wall, an impeller rotatably disposed in said housing having a disk disposed adjacent the first mentioned wall to prevent contact of said fibrous material with said first mentioned wall during its radial flight, a plurality of approximately radially disposed vanes attached at their side edges against said disk and having inner edges sloping from the central area of the impeller outwardly and toward said other wall through an angle such that long strands of fibrous material lodging over said edges will slide outwardly therealong at operating speed, the edges of said vanes adjacent their outer ends being spaced from the inner surface of said other side wall for the passage of said strands therebetween to the periphery of the housing, said vanes also having ends disposed in close proximity to the periphery of the housing, and a plurality of small ribs spaced annularly on said disk on the surface thereof facing said one of said walls and adjacent the periphery of said disk to produce an outward movement of air in the space between the disk and the adjacent side wall and thereby prevent recirculation.

7. In a centrifugal blower for conveying material, the combination of a stationary housing and a vaned impeller, the edge of the impeller vanes first engaging the material having a forwardly and outwardly extending fin set at an angle to direct material toward the center of the stream and away from a stationary wall of the housing, said vanes being provided with notches of saw tooth shape along their outer edges, the apex of said notches coming in close proximity to the inner periphery of the housing.

8. A blower for fibrous material such as silage comprising in combination a housing of somewhat cylindrical peripheral shape having spaced side walls, one of said walls closing a substantial portion of one side of the housing and the second of said walls having a centrally disposed feed conduit for the passage of solid material into the housing and a primary air opening disposed around said feed conduit for admitting air to the housing, said second wall being dished inwardly around said primary air opening to dispose the opening inwardly toward said one of said walls and thereby direct solid material entering through said feed conduit in an inwardly and radially disposed direction away from said second wall, an impeller rotatably disposed in said housing having a plurality of approximately radially disposed vanes, one edge of each of said vanes sloping from the central area of the impeller outwardly and toward said second wall through an angle such that long strands of fibrous material lodging over said edges will slide outwardly therealong at operating speed, the edges of said vanes adjacent their outer ends being spaced from the inner surface of said second side wall for the passage of said strands therebetween to the periphery of the housing, said vanes also having ends disposed in close proximity to the periphery of the housing provided with saw teeth disposed in end to end relationship thereacross to pierce the long strands of fibrous material and prevent wedging thereof at the periphery of the housing.

9. The combination in a blower of a housing of approximately cylindrical shape having spaced side walls, one of said side walls having a centrally disposed feed opening for the passage of solid material, a rotatable disk disposed in said housing along the other of said side walls, and a plurality of vanes secured along one edge to said disk and extending outwardly in said housing, the opposite edge of said vanes being spaced from said one of said side walls a distance for the passage of said material therebetween with substantially no contact with the adjacent side wall, said vanes having outer ends positioned adjacent the inner surface of the periphery of said housing, entrance edges sloping toward said spaced edges at an angle such that long strands of fibrous material trained thereover in the movement of material through the blower will slide therealong under centrifugal force whereby material engaging said entrance edges moves therealong and past said spaced edges under centrifugal force, and fins positioned along said entrance edges projecting from the forward sides of said vanes and terminating short of said spaced edges to cause fibrous material engaging said entrance edges to be deposited into the space between the vanes and away from said side walls.

10. A blower for fibrous material such as silage comprising in combination a housing of somewhat cylindrical peripheral shape having spaced side walls, one of said walls being conically dished and closing a major portion of one side of the housing and the other of said walls having a centrally disposed air inlet opening, an impeller rotatably disposed in said housing comprising a driving hub centrally disposed therein, a plurality of approximately radially disposed vanes connected at their inner ends to said hub adjacent one side edge of the vanes, said hub side edges extending outwardly from said hub in complemental relation to said conical wall, said vanes also having opposite side edges sloping from said hub outwardly and toward said other wall through an angle such that long strands of material lodging over said edges will slide outwardly therealong at operating speed, said opposite side edges of said vanes adjacent their outer ends being spaced from the inner surface of said other side wall for the passage of said strands therebetween to the periphery of the housing, said vanes also having outer ends disposed in close proximity to the periphery of the housing, said sloping opposite side edges providing an open area adjacent said hub for the reception of solid material, and a solid material conduit of smaller size than said air inlet opening projecting into said open area through said air inlet opening to discharge solid material in spaced relation to said walls, the air entering through said inlet opening acting to direct said solid material away from said other wall.

11. A blower for fibrous material such as silage comprising in combination a housing of somewhat cylindrical peripheral shape having spaced side walls, one of said walls being conically dished and closing a substantial portion of one side of the housing and the other of said walls having a centrally disposed air inlet opening, an impeller rotatably disposed in said housing comprising a driving hub centrally disposed therein, a conical disk attached to said hub disposed adjacent to said conical wall, a plurality of approximately radially disposed vanes connected at their inner ends to said hub adjacent one side edge of the vanes, said side edges being attached to said disk and extending outwardly from said hub in complemental relation to said conical wall, said vanes also having opposite side edges sloping from said hub outwardly and toward said other wall through an angle such that long strands of material lodging over said edges will slide outwardly therealong at operating speed, said opposite side edges of said vanes adjacent their outer ends being spaced from the inner surface of said other side wall for the passage of said strands therebetween to the periphery of the housing, said vanes also having outer ends disposed in close proximity to the periphery of the housing, said sloping opposite side edges providing an open area adjacent said hub for the reception of solid material, and a solid material conduit of smaller size than said air inlet opening projecting into said open area through said air inlet opening to discharge solid material in spaced relation to said walls, the air entering through said inlet opening acting to direct said solid material away from said other wall and toward said disk.

12. A blower for fibrous material such as silage comprising in combination a housing of somewhat cylindrical peripheral shape having spaced side walls, one of said walls being conically dished and the other of said walls having a centrally disposed air inlet opening, an impeller rotatably disposed in said housing comprising a driving hub centrally disposed therein, a plurality of approximately radially disposed vanes connected at their inner ends to said hub adjacent one side edge of the vanes, said side edges extending outwardly from said hub in complemental relation to said conical wall, said vanes also having opposite side edges sloping from said hub outwardly and toward said other wall through an angle such that long strands of material lodging over said edges will slide outwardly therealong at operating speed, said opposite side edges of said vanes adjacent their outer ends being spaced from the inner surface of said other side wall for the passage of said strands therebetween to the periphery of the housing, said vanes also having outer ends disposed in close proximity to the periphery of the housing, said sloping opposite side edges providing an open area adjacent said hub for the reception of solid material, and fins positioned along said opposite side edges projecting from the forward sides of said vanes and terminating short of the outer ends thereof to cause material engaging said entrance edges to be disposed into the space between the vanes and away from said side walls, and a solid material conduit of smaller size than said air inlet opening projecting into said open area through said air inlet opening to discharge solid material in spaced relation to said walls, the air entering through said inlet opening acting to direct said solid material away from said other wall.

13. A blower for fibrous material such as silage comprising in combination a housing of somewhat cylindrical peripheral shape having spaced dished side walls, said side walls being dished in the same direction and one of said walls closing a substantial portion of one side of the housing while the other of said walls has a centrally disposed air inlet opening in the dished portion thereof, a dished impeller rotatably disposed in said housing comprising a driving hub centrally disposed therein, a plurality of approximately radially disposed vanes connect at their inner ends to said hub adjacent one side edge of the vanes, said side edges extending outwardly from said hub in complemental relation to said one of said walls, said vanes also having opposite side edges sloping from said hub outwardly and toward said other wall through a greater angle than said one side edge of the vanes through an angle such that long strands of material lodging over said edges will slide outwardly therealong at operating speed, the slope of said side edges providing an open area adjacent said hub and between said opposite side edges and said other wall for the reception of solid material, said vanes also having ends disposed in close proximity to the periphery of the housing, and a solid material conduit of smaller size than said air inlet opening projecting into said open area through said air inlet opening to discharge solid material in spaced relation to said walls, the air entering through said inlet opening acting to direct said solid material away from said other wall.

14. A blower for fibrous material such as silage comprising in combination a housing of somewhat cylindrical peripheral shape having spaced side walls, one of said walls being conically dished and closing a substantial portion of one side of the housing and the other of said walls having a centrally disposed air inlet opening, an impeller rotatably disposed in said housing comprising a driving hub centrally disposed therein, a plurality of approximately radially disposed vanes connected at their inner ends to said hub adjacent one side edge of the vanes, said side edges extending outwardly from said hub in complemental relation to said conical wall, said vanes also having opposite side edges sloping from said hub outwardly and toward said other wall through an angle such that long strands of material lodging over said edges will slide outwardly therealong at operating speed, said opposite side edges of said vanes adjacent their outer ends being spaced from the inner surface of said other side wall for the passage of said strands therebetween to the periphery of the housing, said vanes also having outer ends disposed in close proximity to the periphery of the housing, said sloping opposite side edges providing an open area adjacent said hub for the reception of solid material, and a solid material conduit of smaller size than said air inlet opening projecting into said open area through said air inlet opening to discharge solid material in spaced relation to said walls, the air entering through said inlet opening acting to direct said solid material away from said other wall, said outer ends having saw teeth disposed thereon in end to end relationship formed by straight sided V-shaped notches having a wide angle between the sides in which fibrous material cannot permanently wedge, said teeth being pointed and disposed to pierce the long strands of fibrous material to prevent wedging of the material at the periphery.

CARL E. SWENSON.